(12) United States Patent
Xie et al.

(10) Patent No.: US 10,575,037 B2
(45) Date of Patent: Feb. 25, 2020

(54) VIDEO RECOMMENDING METHOD, SERVER, AND STORAGE MEDIA

(71) Applicant: Tencent Technology (Shenzhen) Company Limited, Shenzhen, Guangdong (CN)

(72) Inventors: Yiran Xie, Shenzhen (CN); Wenyu Zhang, Shenzhen (CN); Zhao Xu, Shenzhen (CN); Yu Xiang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 239 days.

(21) Appl. No.: 15/704,882

(22) Filed: Sep. 14, 2017

(65) Prior Publication Data

US 2018/0007409 A1    Jan. 4, 2018

Related U.S. Application Data

(63) Continuation of application No. PCT/CN2016/082336, filed on May 17, 2016.

(30) Foreign Application Priority Data

Jul. 6, 2015    (CN) .......................... 2015 1 0392358

(51) Int. Cl.
*H04N 21/25*    (2011.01)
*G06F 16/71*    (2019.01)
(Continued)

(52) U.S. Cl.
CPC .......... *H04N 21/251* (2013.01); *G06F 16/71* (2019.01); *G06F 16/735* (2019.01);
(Continued)

(58) Field of Classification Search
CPC .... H04B 1/202; H04N 21/4668; H04N 7/163; H04N 21/44218; H04N 5/44591;
(Continued)

(56) References Cited

U.S. PATENT DOCUMENTS

| | | | |
|---|---|---|---|
| 2008/0216138 A1* | 9/2008 | Minnick | H04B 1/202 725/110 |
| 2008/0256453 A1* | 10/2008 | Fein | H04N 7/163 715/732 |

(Continued)

FOREIGN PATENT DOCUMENTS

| | | |
|---|---|---|
| CN | 102957950 A | 3/2013 |
| CN | 102970605 A | 3/2013 |

(Continued)

OTHER PUBLICATIONS

International Search Report and Written Opinion dated Jul. 27, 2016 for PCT Application No. PCT/CN2016/082336, 19 pages.

(Continued)

*Primary Examiner* — Etienne P Leroux
(74) *Attorney, Agent, or Firm* — Brinks Gilson & Lione (57) ABSTRACT

A video recommending method, including: obtaining videos, the video including long videos and short videos; obtaining a subset of the long videos, of which video attribute values are greater than corresponding attribute thresholds; obtaining a watching record of a user, and obtaining similarities between the short videos and videos in the watching record, to extract a preset quantity of short videos having highest similarities; and recommending the subset of the long videos, of which video attribute values are greater than corresponding attribute thresholds, to the user, and/or recommending the preset quantity of short videos having highest similarities to the user.

18 Claims, 9 Drawing Sheets

(51) Int. Cl.
*G06F 16/735* (2019.01)
*G06F 16/78* (2019.01)
*H04N 21/442* (2011.01)
*H04N 21/8405* (2011.01)
*H04N 21/482* (2011.01)
*H04N 21/658* (2011.01)
*H04N 21/258* (2011.01)

(52) U.S. Cl.
CPC ... *G06F 16/7867* (2019.01); *H04N 21/25891* (2013.01); *H04N 21/44204* (2013.01); *H04N 21/44222* (2013.01); *H04N 21/4826* (2013.01); *H04N 21/6582* (2013.01); *H04N 21/8405* (2013.01)

(58) Field of Classification Search
CPC . H04N 21/251; G06F 16/9535; G06F 16/739; G06Q 30/0201; G06Q 30/0282
See application file for complete search history.

(56) References Cited

U.S. PATENT DOCUMENTS

| | | | |
|---|---|---|---|
| 2009/0019488 A1 | 1/2009 | Ruiz-Velasco et al. | |
| 2011/0131595 A1 | 6/2011 | Xue et al. | |
| 2014/0053105 A1* | 2/2014 | Sakata | H04N 21/44218 715/811 |
| 2014/0215506 A1 | 7/2014 | Kalmes et al. | |
| 2014/0282709 A1 | 9/2014 | Hardy et al. | |
| 2015/0066583 A1* | 3/2015 | Liu | G06Q 30/0201 705/7.29 |
| 2015/0066959 A1* | 3/2015 | Yi | G06F 16/9535 707/751 |
| 2015/0256881 A1* | 9/2015 | Ellis | H04N 5/44591 725/28 |
| 2016/0071170 A1* | 3/2016 | Massoulie | G06Q 30/0282 705/26.7 |
| 2016/0182955 A1* | 6/2016 | Klappert | H04N 21/4668 725/14 |
| 2016/0239501 A1* | 8/2016 | Qiao | G06F 16/739 |

FOREIGN PATENT DOCUMENTS

| | | |
|---|---|---|
| CN | 103136275 A | 6/2013 |
| CN | 103491441 A | 1/2014 |
| CN | 104156472 A | 11/2014 |
| CN | 104219575 A | 12/2014 |
| CN | 104598505 A | 5/2015 |
| CN | 104699696 A | 6/2015 |

OTHER PUBLICATIONS

Examination Report dated Jul. 23, 2019 for European Application No. 16820705.8, 4 pages.

Office Action dated Aug. 2, 2019 for Chinese Application No. 201510392358.8 with concise English Translation, 9 pages.

* cited by examiner

VIDEO RECOMMENDING METHOD, SERVER, AND STORAGE MEDIA

RELATED APPLICATION

This application is a continuation application of PCT Patent Application No. PCT/CN2016/082336, filed on May 17, 2016, which claims priority to Chinese Patent Application No. 201510392358.8, filed with the Chinese Patent Office on Jul. 6, 2015, both of which are incorporated herein by reference in their entireties.

FIELD OF THE TECHNOLOGY

The present disclosure relates to the field of network data processing technologies, and in particular, to a video recommending method, a server, and storage media.

BACKGROUND OF THE DISCLOSURE

With the development of network technologies, watching network videos on video websites has become a mainstream manner for people's entertainment and learning. To help a user find, among millions of network videos, videos that the user likes, each video website recommends videos to the user in various presentation manners.

For video recommendation, video labels (for example, leading characters, directors, actors, and brief introduction of a film) and a watching record of a user are usually used. In a conventional video recommending method, interest of a user is usually analyzed according to a historical watching record of the user, so as to recommend videos to the user. Alternatively, other videos having video labels the same as that in the historical watching record are recommended for the user. For example, if the user has watched "Lock, Stock and Two Smoking Barrels", other works of Guy Ritchie are recommended to the user. Videos may be divided into long videos and short videos according to video durations.

However, users have different standards for selection of long videos and short videos. In the conventional video recommending method, long videos and short videos are not separately processed for recommendation, and consequently, the accuracy of recommendation is not high enough.

SUMMARY

A video recommending method, a server, and a storage media disclosed in this application resolve one or more problems involved in the background.

A video recommending method, including:
  obtaining, by a device comprising a memory storing instructions and a processor in communication with the memory, videos comprising long videos and short videos;
  obtaining, by the device, a subset of the long videos, wherein values of video attributes of the subset of the long videos are greater than corresponding attribute thresholds;
  obtaining, by the device, a watching record of a user;
  obtaining, by the device, similarities between the short videos and videos in the watching record to extract a preset quantity of the short videos having highest similarities; and
  recommending, by the device, the subset of the long videos or the preset quantity of the short videos to the user.

A server, including a memory and a processor, the memory storing an instruction, and the instruction, when executed by the processor, causing the processor to perform the following steps:
  obtaining videos, the video including long videos and short videos;
  obtaining a subset of the long videos, wherein values of video attributes of the subset of the long videos are greater than corresponding attribute thresholds;
  obtaining a watching record of a user;
  obtaining similarities between the short videos and videos in the watching record, to extract a preset quantity of the short videos having highest similarities; and
  recommending the subset of the long videos or the preset quantity of the short videos to the user.

A non-transitory computer readable storage medium storing computer executable instructions, the computer executable instructions, when executed by one or more processors, causing the one or more processors to perform the following steps:
  obtaining videos, the video including long videos and short videos;
  obtaining a subset of the long videos, wherein values of video attributes of the subset of the long videos are greater than corresponding attribute thresholds;
  obtaining a watching record of a user;
  obtaining similarities between the short videos and videos in the watching record, to extract a preset quantity of the short videos having highest similarities; and
  recommending the subset of the long videos or the preset quantity of the short videos to the user.

Details of one or more embodiments of the present disclosure are provided in the following accompanying drawings and descriptions. Other features, objectives, and advantages of the present disclosure will become apparent from the specification, the accompanying drawings, and the claims.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still derive other drawings from these accompanying drawings without creative efforts.

DESCRIPTION OF EMBODIMENTS

To make the objective, technical solutions, and advantages of the present disclosure clearer, the present disclosure is further described below in detail with reference to the accompanying drawings and embodiments. It should be understood that the specific embodiments described herein are only used to explain the present disclosure, rather than limit the present disclosure.

Figure 1:
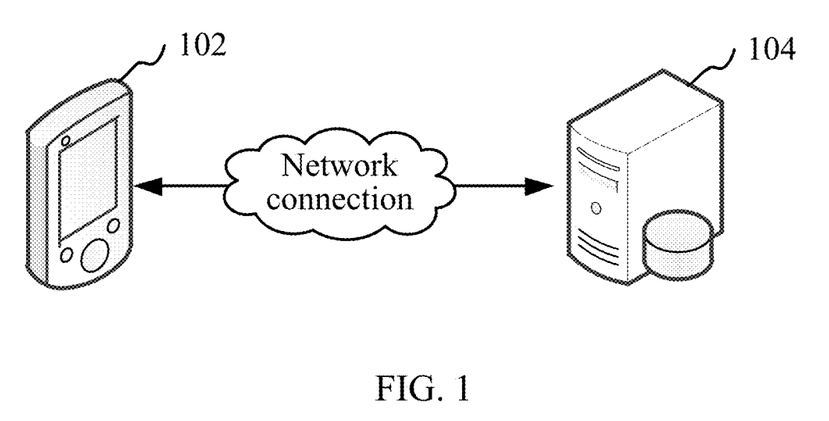
FIG. 1 is a diagram of an application environment in which a video recommending method is implemented according to an embodiment.

FIG. 1 is a diagram of an application environment in which a video recommending method is implemented according to an embodiment. The application environment includes a user terminal 102 and a server 104. The user terminal 102 may be any terminal on which a video application is installed, for example, a mobile phone, a notebook computer, a tablet computer, or a desktop computer. The server 104 may be one or more servers. The user terminal 102 communicates with the server 104 by using a network through a network connection.

Figure 2:
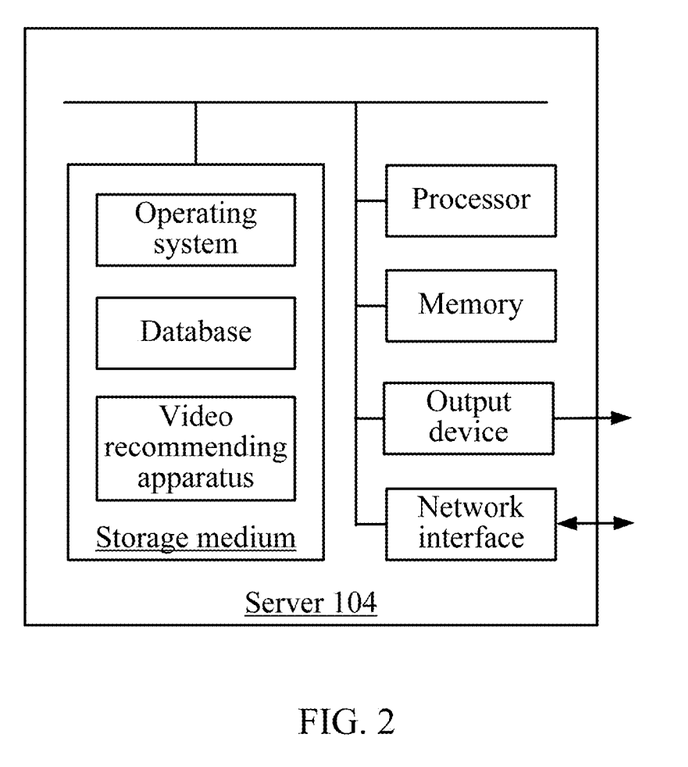
FIG. 2 is a schematic diagram of an inner structure of a server according to an embodiment.

In an embodiment, a schematic diagram of an inner structure of the server 104 in the foregoing FIG. 1 is shown in FIG. 2. The server 104 includes a processor, a memory, a non-volatile storage medium, a network interface, and an output device that are connected by using a system bus. The storage medium of the server stores an operating system, a database, and a video recommending apparatus, and the video recommending apparatus is configured to implement a video recommending method. The processor of the server 104 is configured to execute a video recommending method, for providing capabilities to compute and control, and for supporting operation of the entire server 104. The memory of the server 104 provides an environment for operation of the video recommending apparatus in the storage medium. The network interface of the server 104 is configured to perform network communication with the user terminal 102. The output device includes a display screen.

Figure 3:
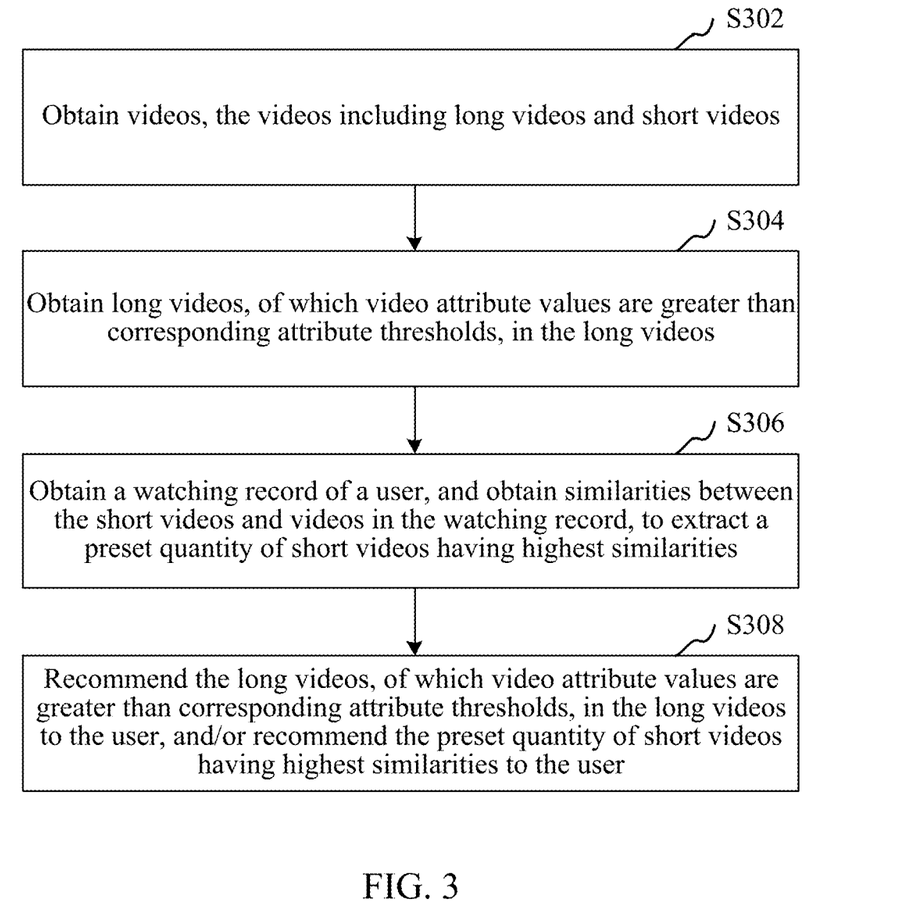
FIG. 3 is a schematic flowchart of a video recommending method according to an embodiment.

As shown in FIG. 3, in an embodiment, a video recommending method is provided. In this embodiment, applying the method to the server in the foregoing FIG. 1 is described as an example.

The video recommending method specifically includes the following steps:

Step S302: Obtain videos.

Specifically, the server may obtain videos from a data source of network videos. The data source is a device or an original medium that provides needed data. The data source stores information about all established database connections. Similar to finding a file in a file system according to a specified file name, a corresponding database connection to obtain a video can be found by providing a correct data source name.

Each video has corresponding video information, for example, a video duration and a video title. The video duration is time for playing an entire video in normal cases. Videos may be divided into long videos and short videos according to video durations. The video duration may be several seconds, or may be several hours. A duration demarcation point (such as 45 minutes) is preset. Videos, of which video durations are greater than or equal to 45 minutes, such as TV series, cartoons, and films are long videos, and videos, of which video durations are less than 45 minutes, such as advertisements and news are short videos. In consideration of that users have different standards for selection of long videos and short videos, videos are divided into long videos and short videos for processing, to better satisfy requirements of the users. The video title may be a word string including words of different parts of speech, such as nouns and verbs.

Further, the video information may further include an album identifier, a video identifier, a video type, a video subtype, and the like. The album identifier and the video identifier are strings including letters and numbers. For example, the album identifier may be r0154jba1kd, and the video identifier may be 3tvgfggkrubwssx, and the like. The video type is usually represented by a number. For example, 1 represents a film; 2 represents a TV series; 3 represents a cartoon; 9 represents a documentary; 10 represents a performance video; and the like.

Step S304: Obtain long videos, of which video attribute values are greater than corresponding attribute thresholds, in long videos.

Specifically, video attributes generally include a quantity of clicks on a video, watching times, a watching completion rate, and the like. A video attribute value is a value corresponding to each video attribute. The quantity of clicks on a video is a sum of clicks on the video. The watching times are a sum of times in which click and play time of the video exceeds a preset duration (for example, 20 minutes). The watching completion rate is an average value obtained by adding a watching completion rate of each time watching the video, and then dividing the sum by the quantity of clicks on the video. The watching completion rate of each time watching the video is obtained by dividing a watching duration of each time by a video duration. An attribute threshold is a threshold preset for each video attribute. For example, an attribute threshold of the quantity of clicks on a video may be set as 10000, and an attribute threshold of the watching times may be set as 8000, and the like. A corresponding attribute threshold may be set for each video attribute according to different requirements. For example, the video title is "Forrest Gump", and the video duration is 80 minutes. Assuming that the video is clicked for 10000 times, in 5000 times, click and play time is 80 minutes (exceeding the preset duration), and in 5000 times, click and play time is 1 minute (not exceeding the preset duration), the quantity of clicks on the video is 10000, the watching times are 5000, and the watching completion rate is 0.50625.

Long videos, of which video attribute values are greater than corresponding attribute thresholds, in the long videos are obtained by setting corresponding attribute thresholds. The obtained long videos are a subset of the long videos.

Step S306: Obtain a watching record of a user, and obtain similarities between short videos and videos in the watching record, to extract a preset quantity of short videos having highest similarities.

Specifically, when a user enters a video application by using a user terminal, the user may watch videos with an identity of a guest or a member. The guest is a user that does not perform login, and the member is a user that performs login. When the user enters the video application by using the user terminal, a server can obtain a corresponding watching record. If the user is a member, the server obtains a watching record corresponding to an account of the member, and if the user is a guest, the server obtains a watching record corresponding to an IP address of the user terminal used by the guest. The watching record of the user is video information corresponding to videos that have been watched by the user.

For example, if user A corresponding to a user identity has watched TV series "Friends", the watching record stores video information about "Friends".

Similarity between short videos and videos in the watching record is obtained, and a preset quantity of short videos having highest similarities are extracted. For example, similarities between 10 short videos and the videos in the watching record are respectively 1, 1, 0.9, 0.8, 0.2, 0.3, 0.5, 0.4, 0.9, and 0.7, and 5 short videos having highest similarities need to be extracted, then five short videos having similarities 1, 0.9, and 0.8 with the videos in the watching record are extracted.

Step S306 may be performed before or after step S304.

Step S308: Recommend the long videos, of which video attribute values are greater than corresponding attribute thresholds, in long videos to the user, and/or recommend the preset quantity of short videos having highest similarities to the user.

Usually, the video attribute values can objectively reflect the degree of preference of the user for the video. A higher video attribute value (for example, more watching times or a higher watching completion rate) indicates a larger quantity of users interested in the video. A video duration of a long video is relatively long, and a video title thereof cannot well reflect content of the video, and therefore, the long videos, of which video attribute values are greater than corresponding attribute thresholds, in long videos are recommended to the user. A video duration of a short video is relatively short, and a corresponding video title thereof can well reflect content of the video. In addition, the watching record can reflect video content that the user is relatively more interested in, and therefore, the preset quantity of videos having highest similarities with the video information in the watching record are recommended to the user.

In an embodiment, the video attribute values and the watching record are updated in real time.

It may be understood that in other embodiments, long videos or short videos may also be recommended to the user by combining the video attribute values and the video similarities.

According to the foregoing video recommending method, in consideration of that users have different standards for selection of long videos and short videos from network videos, long videos, of which video attribute values are greater than corresponding attribute thresholds, in long videos are obtained; a watching record of a user is obtained, and similarities between short videos and videos in the watching record are obtained, to extract a preset quantity of short videos having highest similarities, so as to recommend the long videos, of which video attribute values are greater than corresponding attribute thresholds, in long videos to the user, and/or recommend the preset quantity of short videos having highest similarities to the user. Different recommendation standards are used for different features of the long videos and the short videos, so that the accuracy of recommendation is improved.

In an embodiment, the step of obtaining long videos, of which video attribute values are greater than corresponding attribute thresholds, in long videos includes: obtaining, according to preset priority data, videos, of which the watching times are greater than a times threshold, in long videos updated within preset time and/or obtaining videos, of which the watching completion rate is greater than a completion rate threshold, in the long videos updated within the preset time.

Specifically, in consideration of that the quantity of videos updated each day is excessively large, to reduce the calculation amount and complexity of data, only the watching times and watching completion rates of the long videos updated within the preset time are obtained. For example, if the preset time is 15 days, then when the server collects statistics on data on Jul. 1, 2015, the server collects statistics only on the watching times and watching completion rate of each video in long videos updated after Jun. 15, 2015.

In an embodiment, the user may self-define the preset time.

The preset priority data is a condition, or a recommending criterion, which is preset according to an actual requirement and under which long videos are recommended in priority, such as the watching times in priority, or the watching completion rate in priority. The priority data may be set to recommend long videos, of which watching times are greater than a times threshold (such as 5000) to the user in priority, or may be set to recommend long videos, of which the watching completion rate is greater than a completion rate threshold (such as 80%) to the user in priority. It may be understood that the priority data may also be set to recommend long videos, of which the watching times are greater than the times threshold (such as 5000) and the completion rate is greater than the completion rate threshold (such as 80%).

Figure 4:
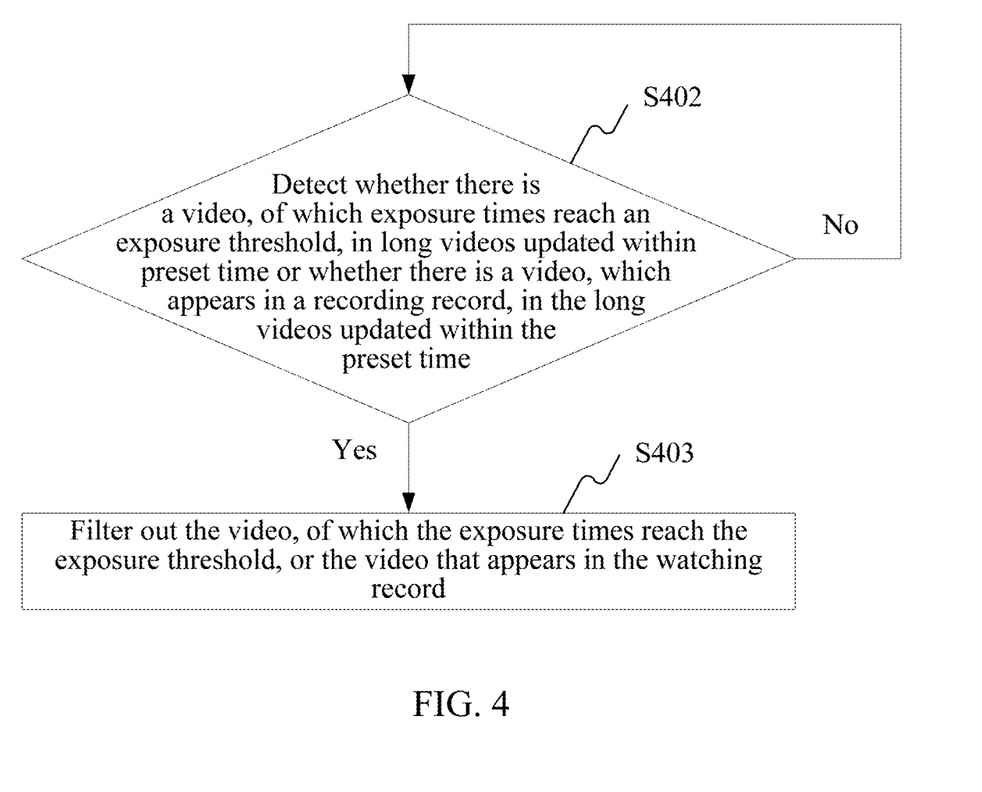
FIG. 4 is a partial flowchart of a video recommending method according to another embodiment.

As shown in FIG. 4, in an embodiment, the video recommending method further includes:

Step S402: Detect whether there is a video, of which exposure times reach an exposure threshold, in long videos updated within preset time or whether there is a video, which appears in a watching record, in the long videos updated within the preset time. If there is a video, of which the exposure times reach the exposure threshold, in the long videos updated within the preset time or there is a video, which appears in the watching record, in the long videos updated within the preset time, step S403 is performed; otherwise, step S402 continues to be performed.

Specifically, a server recommends videos to a user of a user terminal in a manner of a video recommending table. An exposure behavior of a video is a behavior that video information appears in the video recommending table. The exposure times are times of appearance of the video in the video recommending table, and are based on times of entrance of the user into a video application. For example, if the user enters the video application twice today, and a video appears in the video recommending table each time the user enters the video application, then the exposure times of the video are 2.

Step S403: Filter the video, of which the exposure times reach the exposure threshold, or the video that appears in the watching record. When the exposure times reach the exposure threshold means when the exposure times is equal to or larger than the exposure threshold. That the server filter the video means that the server filter out the video and does not recommend the video to the user.

When the exposure times of a video reach the exposure threshold, and the user has not clicked the video to watch, it indicates that the user may not be interested in the video, and the video is filtered out, so that the server does not recommend the video to the user next time. Moreover, if a video appears in the watching record, it indicates that the user has watched the video, so that the server does not recommend the video to the user next time, either. In this way, videos that the user has watched and that have relatively large exposure times can be filtered out in time, so as to improve the accuracy of video recommendation.

During the filtering process, there is a pre-established filter table. Videos to be filtered are placed in the filter table for filtration. The length of the filter table is limited by a length threshold, and the filter table uses a first in first out storage manner. For example, if the length of the filter table is 10, that is, only information about 10 videos to be filtered can be stored. When information about the 11th video to be filtered needs to be stored in the filter table, information about the first video in the filter table is deleted, and then the information about the 11th video to be filtered is stored in the filter table.

Figure 5:
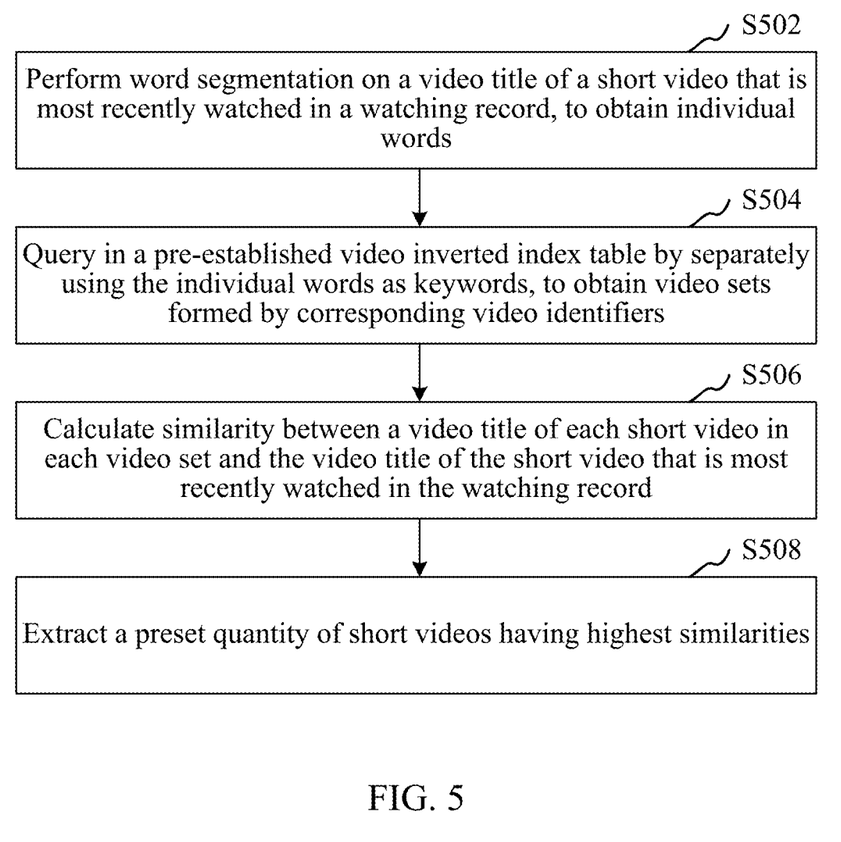
FIG. 5 is a specific flowchart of obtaining similarities between short videos and videos in a watching record, to extract a preset quantity of short videos having highest similarities according to an embodiment.

As shown in FIG. 5, in an embodiment, a step of obtaining similarities between short videos and videos in a watching record, to extract a preset quantity of short videos having highest similarities includes:

Step S502: Perform word segmentation on a video title of a short video that is most recently watched in the watching record, to obtain individual words.

Specifically, the word segmentation is a process of segmenting a character sequence into individual words. Word segmentation is performed on the video title of the short video that is most recently watched in the watching record according to parts of speech. For example, if a video title of a short video is "Five Pieces of Concept Stocks such as Intelligent Machine Limit Up", after word segmentation, seven individual words, that is, "intelligent" (or "intelligence" with the same root), "machine", "such as", "five" "pieces", "concept stocks", and "limit up" are obtained, and their parts of speech are respectively a noun, a noun, an auxiliary, a numeral, an adverb, a noun, and a verb.

Further, different weights may also be set for different parts of speech. For example, weights of nouns and adjectives are set to 1; weights of auxiliaries and adverbs are set to 0.5; weights of verbs are set to 0.8; and weights of special nouns are set to 1.5.

Step S504: Query in a pre-established video inverted index table by separately using the individual words as keywords, to obtain video sets formed by corresponding video identifiers.

Specifically, the inverted index is also referred to as a reverse index, is an index method, used to store a mapping of a word at a storage position of a file or a group of files, and is a most commonly used data structure in a file search system. All files including the word can be quickly obtained by using the inverted index.

In an embodiment, when an inverted index table is searched by using an individual word as a keyword, if the keyword can be found, video identifies corresponding to the keyword are inserted into a corresponding position of the inverted index table, and meanwhile, a video set formed by the corresponding video identifiers is returned to. If the keyword cannot be found, an entry of the keyword is newly created in the inverted index table, and video identifiers corresponding to the keyword are inserted into a corresponding position of the inverted index table.

Step S506: Calculate similarity between a video title of each short video in each video set and the video title of the short video that is most recently watched in the watching record.

Step S508: Extract a preset quantity of short videos having highest similarities.

Specifically, in step S506, the similarity between the video title of each short video in each video set and the video title of the short video that is most recently watched in the watching record is calculated, but only a preset quantity (such as 5) of videos having highest similarities are recommended to a user.

As stated above, the user watches a short video with a video title "Five Pieces of Concept Stocks such as Intelligent Machine Limit Up", and by calculation, similarities between video titles of all short videos including at least one word of "intelligent", "machine", "such as", "five" "pieces", "concept stocks", and "limit up" and the video title "Five Pieces of Concept Stocks such as Intelligent Machine Limit Up" are obtained. The similarities are respectively 1, 0.8, 0.9, 0.5, 2, 0.9, 1, 1, and 0.5. If the preset quantity is 5, then 3 short videos, of which the similarities are 1 and two short videos, of which the similarities are 0.9 are recommended to the user.

In an embodiment, the step of calculating similarity between a video title of each short video in each video set and the video title of the short video that is most recently watched in the watching record includes: obtaining one or more words, which are both in the video title of each short video in the video set and in the video title of the short video that is most recently watched in the watching record, and using a maximum weight in weights of the same one or more words as the similarity.

For example, a video identifier of a short video that is most recently watched by the user is "r001319tsdd", and the video title is "Five Pieces of Concept Stocks such as Intelligent Machine Limit Up". After word segmentation, seven individual words, that is, "intelligent", "machine", "such as", "five" "pieces", "concept stocks", and "limit up" are obtained, and their weights are respectively 1, 1, 0.5, 0.05, 0.5, 1, and 0.8. The foregoing seven words are separately used as keywords to perform query in the pre-established inverted index table. For example, when query is performed by using "intelligent" as a keyword to obtain a video set formed by corresponding video identifiers, a video identifier of a short video in the video set is "x0016wetcy5", and the video title is "Father of Artificial Intelligence: Turing (five)"; then when the similarity between the two short videos with the video identifiers "r001319tsdd" and "x0016wetcy5", words "intelligent/intelligence" and "five" that are in both two titles need to be obtained. Because the weight of "intelligent/intelligence" is 1, and the weight of "five" is 0.05, 1 is used as the similarity between the two short videos.

Further, in an embodiment, a step of calculating a product between a weight of each individual word and a preset time attenuation factor, and using the product as a final weight to calculate the similarity is further included.

As stated above, if a publishing time difference of the two short videos with the video identifiers "r001319tsdd" and "x0016wetcy5" is ten days, and the preset time attenuation factor is 0.4, then the weight of "intelligent (intelligence)" is 1*0.4=0.4, and the weight of "five" is 0.05*0.4=0.02, and therefore, 0.4 is used as the similarity between the two short videos.

The principle of the foregoing video recommending method is described below by using a specific application scenario, and the application scenario is described in a case in which a mobile phone is used as a user terminal.

Figure 6:
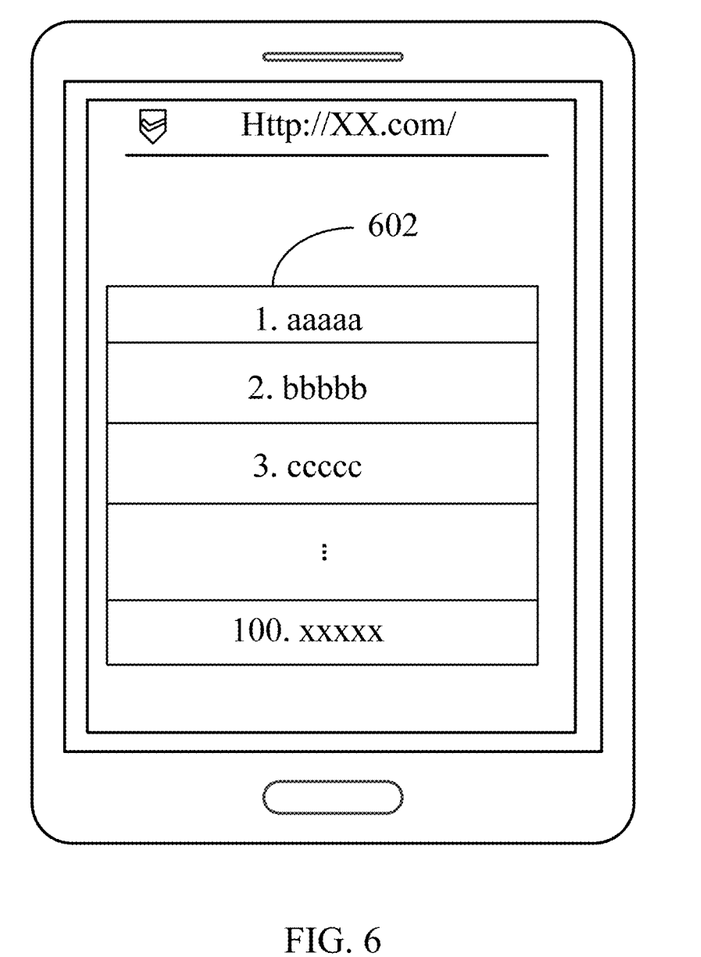
FIG. 6 is a diagram of a user terminal interface of a video recommending method in a specific application scenario.

As shown in FIG. 6, after a user logs in to a video application by using a mobile phone, the user enters a user interface provided with a video recommending table 602. The video recommending table 602 is updated in real time. A server processes, in real time, data generated by clicking or watching a video by using the video application on each user terminal. It is assumed that video information that is corresponding to videos and that is obtained by the server and video attribute values obtained by statistics collection are shown in Table 1, and a user watching record obtained by the server is shown in Table 2.

TABLE 1

| Type | Video title | Video duration | Watching times | Watching completion rate |
|---|---|---|---|---|
| Film | Avatar | 2 hours | 5000 | 97% |
| Film | Captain America | 1.5 hours | 3000 | 90% |
| TV series | Friends | 45 minutes | 8000 | 50% |
| Variety show | The Voice of China | 1 hour | 10000 | 80% |
| Animation | Transformers | 20 minutes | 1000 | 95% |
| News | Election of Barack Obama as the President | 10 minutes | 6000 | 100% |

TABLE 2

| User identity | Watching record | Watching time |
|---|---|---|
| A | Forrest Gump | 18:00, Jul. 1, 2015 |
|   | Gossip Girls | 12:00, Jun. 28, 2015 |
|   | The Amazing Race | 20:00, Jun. 27, 2015 |

The videos in Table 1 are all videos updated within 15 days, that is, videos that newly get online within 15 days. The videos in Table 1 are divided into long videos and short videos according to video durations. "Avatar", "Captain America", "Friends", and "The Voice of China", of which video durations are greater than or equal to 45 minutes are long videos, and "Transformers" and "Election of Barack Obama as the President", of which video durations are less than 45 minutes are short videos.

Assuming that the server recommends videos, of which the watching times are greater than 7999 to the user according to preset priority data, "Friends" and "The Voice of China" in the long videos are updated in the video recommending table 602 for recommendation to the user.

The video that is most recently watched by User A in Table 2 is "Forrest Gump", and short videos related to the video title "Forrest Gump" are updated in the video recommending table 602 for recommendation to the user.

Figure 7:
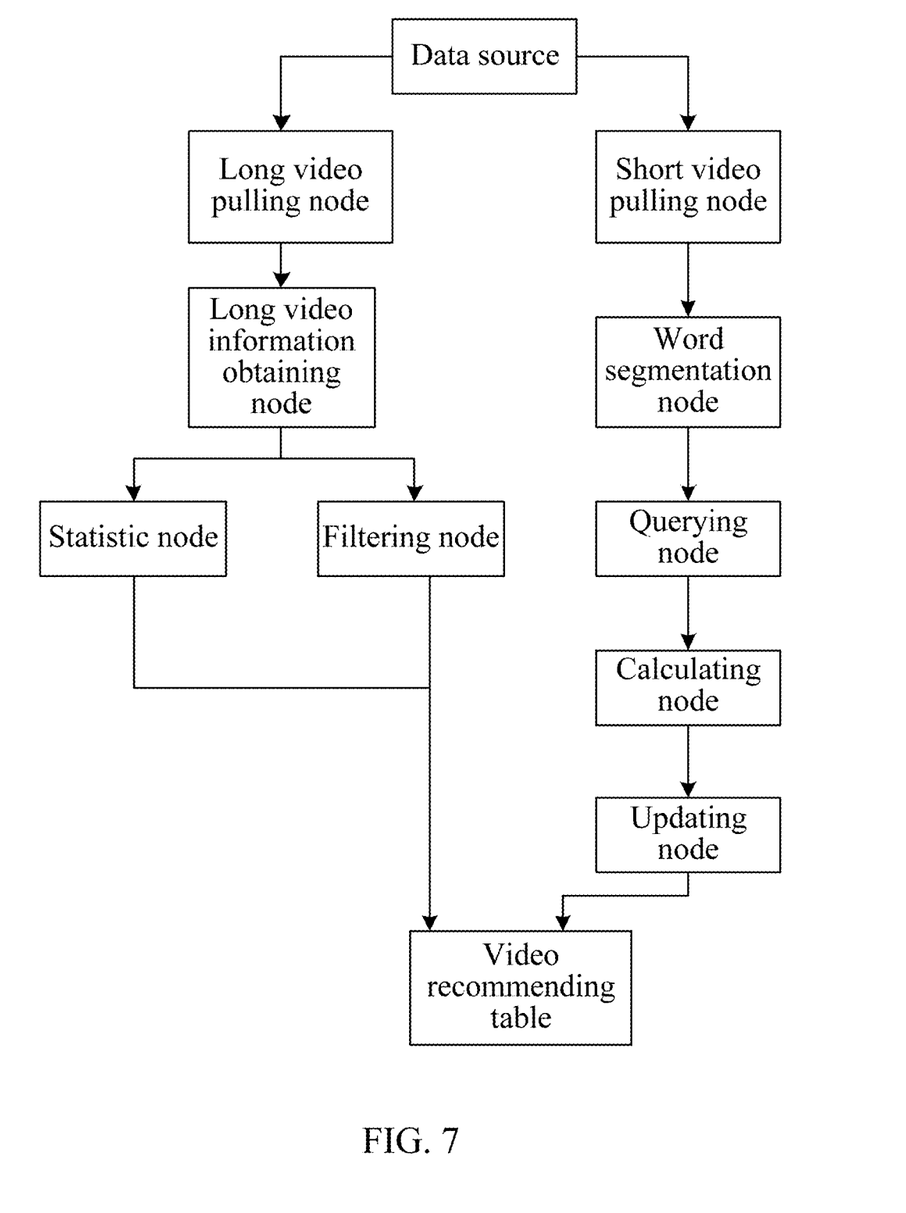
FIG. 7 is an architectural diagram of implementing a video recommending process in a specific application scenario.

FIG. 7 is an architectural diagram of implementing a video recommending process in a specific application scenario. A long video pulling node and a short video pulling node separately pull data from a data source for processing. Data related to long videos is processed by a long video information obtaining node, a statistic node, and a filtering node, and then is updated in a video recommending table for recommendation to a user. Data related to short videos is processed by a word segmentation node, a querying node, a calculation node, and an updating node, and then is also updated in the video recommending table for recommendation to the user.

An embodiment of the present invention further provides a server. An inner structure of the server may correspond to the structure shown in FIG. 2, and the following modules may all or partially be implemented by using software, hardware, or a combination thereof.

Figure 8:
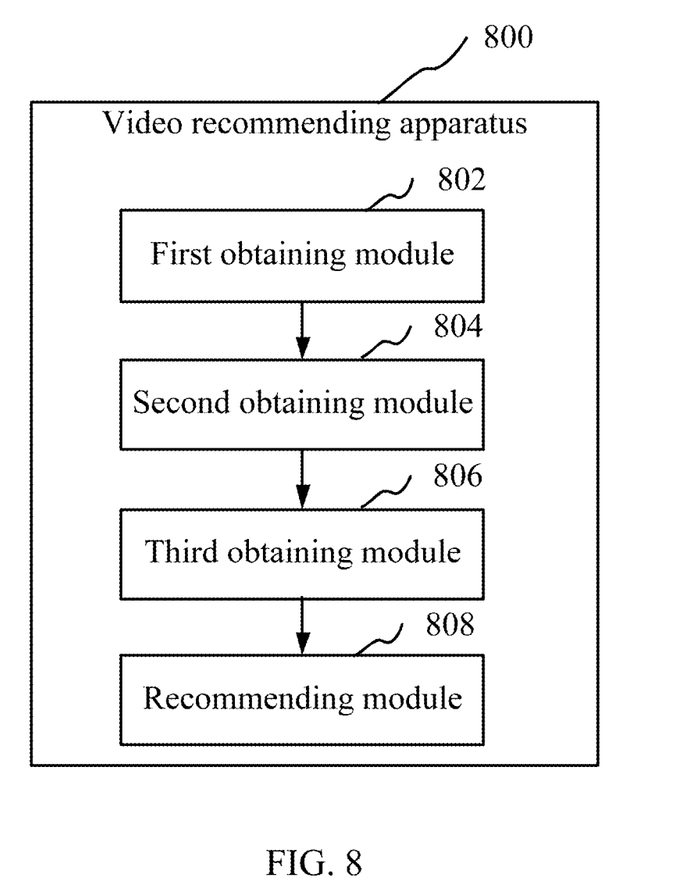
FIG. 8 is a structural block diagram of a server according to an embodiment.

In an embodiment, as shown in FIG. 8, a server 800 in this embodiment includes a first obtaining module 802, a second obtaining module 804, a third obtaining module 806, and a recommending module 808.

The first obtaining module 802 is configured to obtain videos, the video including long videos and short videos. The second obtaining module 804 is configured to obtain a subset of the long videos, of which video attribute values are greater than corresponding attribute thresholds, in the long videos. The third obtaining module 806 is configured to obtain a watching record of a user, and obtain similarities between the short videos and videos in the watching record, to extract a preset quantity of short videos having highest similarities. The recommending module 808 is configured to recommend the long videos, of which video attribute values are greater than corresponding attribute thresholds, in the long videos to the user, and/or recommend the preset quantity of short videos having highest similarities to the user.

In an embodiment, the second obtaining module 804 includes an obtaining unit. The obtaining unit is configured to obtain, according to preset priority data, videos, of which watching times are greater than a times threshold, in long videos updated within preset time and/or obtain videos, of which a watching completion rate is greater than a completion rate threshold, in the long videos updated within the preset time.

Figure 9:
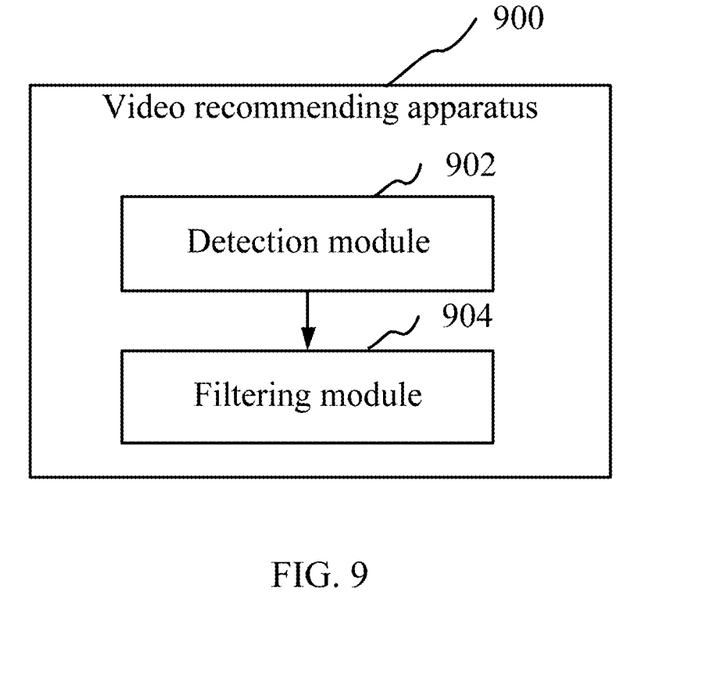
FIG. 9 is a partial structural block diagram of a server according to another embodiment.

With reference to FIG. 9, in an embodiment, another server 900 is provided, and has a function of implementing the video recommending method according to the foregoing various embodiments. The server 900 includes a detection module 902 and a filtering module 904.

Specifically, the detection module 902 is configured to detect whether there is a video, of which exposure times reach an exposure threshold, in long videos updated within preset time or whether there is a video, which appears in a watching record, in the long videos updated within the preset time.

The filtering module 904 is configured to filter out the video, of which the exposure times reach the exposure threshold, or the video that appears in the watching record.

Figure 10:
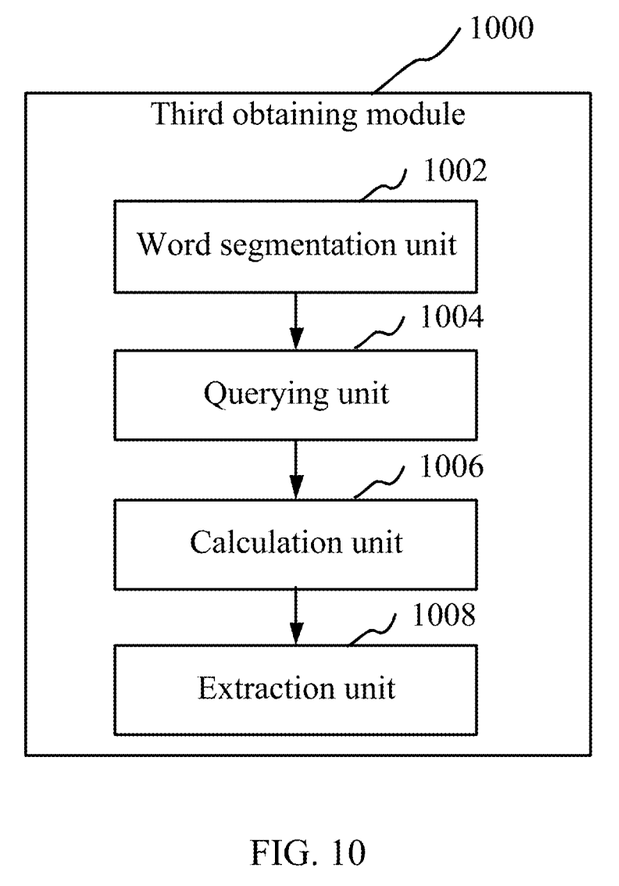
FIG. 10 is a structural block diagram of a third obtaining module according to an embodiment.

With reference to FIG. 10, in an embodiment, a third obtaining module 1000 includes a word segmentation unit 1002, a querying unit 1004, a calculation unit 1006, and an extraction unit 1008.

Specifically, the word segmentation unit 1002 is configured to perform word segmentation on a video title of a short video that is most recently watched in a watching record, to obtain individual words.

The querying unit 1004 is configured to query in a pre-established video inverted index table by separately using the individual words as keywords, to obtain video sets formed by corresponding video identifiers. The calculation unit 1006 is configured to calculate similarity between a video title of each short video in each video set and the video title of the short video that is most recently watched in the watching record.

The extraction unit 1008 is configured to extract a preset quantity of short videos having highest similarities.

In an embodiment, the calculation unit 1006 is configured to obtain a word, which is in both the video title of each short video in the video set and in the video title of the short video that is most recently watched in the watching record, and use a maximum weight in weights of the same word as the similarity.

A person of ordinary skill in the art may understand that all or some of the steps of the method of the foregoing embodiments may be implemented by a computer program instructing relevant hardware. The program may be stored in a computer readable storage medium. When the program is executed, steps of the method of the foregoing embodiments may be included. The storage medium may be a non-volatile storage medium, such as a magnetic disk, a compact disc, or a read-only memory (ROM), a random access memory (RAM), or the like.

The technical features of the foregoing embodiments may be arbitrarily combined. To make descriptions brief, not all possible combinations of the technical features in the foregoing embodiments are described. However, as long as the combinations of the technical features are not contradictory with each other, they should be considered to fall within the scope of the present disclosure.

The foregoing embodiments only describe several implementations of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A video recommending method, comprising:
obtaining, by a device comprising a memory storing instructions and a processor in communication with the memory, videos comprising long videos and short videos;
obtaining, by the device, a subset of the long videos, wherein values of video attributes of the subset of the long videos are greater than corresponding attribute thresholds, wherein the video attributes comprise watching times and a watching completion rate, the watching completion rate is obtained by dividing a sum of individual watching completion rates by a quantity of numbers of the video being played, and each of the individual watching completion rates is obtained by dividing a duration of individual watching a video by a duration of the video;
obtaining, by the device, a watching record of a user;
obtaining, by the device, similarities between the short videos and videos in the watching record to extract a preset quantity of the short videos having highest similarities; and
recommending, by the device, the subset of the long videos or the preset quantity of the short videos to the user.

2. The method according to claim 1, wherein:
the obtaining the subset of the long videos comprises:
obtaining, by the device, according to preset priority data, the subset of the long videos, wherein:
the long videos are updated within preset time, and the watching times of the subset of the long videos are greater than a times threshold, or the watching completion rate of the subset of the long videos is greater than a completion rate threshold.

3. The method according to claim 1, wherein:
the obtaining the subset of the long videos comprises:
obtaining, by the device, according to preset priority data, the subset of the long videos, wherein:
the long videos are updated within preset time, and the watching times of the subset of the long videos are greater than a times threshold, and the watching completion rate of the subset of the long videos is greater than a completion rate threshold.

4. The method according to claim 1, further comprising:
detecting, by the device, whether exposure times of a video in long videos updated within preset time reach an exposure threshold, or whether a video in the long videos updated within the preset time appears in the watching record; and
when it is detected that the exposure times of the video in the long videos updated within the preset time reach the exposure threshold, or the video in the long videos updated within the preset time appears in the watching record, filtering out, by the device, the video from recommending to the user.

5. The method according to claim 1, wherein the obtaining the similarities between the short videos and the videos in the watching record to extract the preset quantity of the short videos having highest similarities comprises:
performing, by the device, word segmentation on a video title of a short video that is most recently watched in the watching record, to obtain individual words;
querying in, by the device, a pre-established video inverted index table by separately using the individual words as keywords, to obtain video sets formed by corresponding video identifiers;
calculating, by the device, the similarity between a video title of each short video in each video set and the video title of the short video that is most recently watched in the watching record; and
extracting, by the device, the preset quantity of the short videos having highest similarities.

6. The method according to claim 5, wherein the calculating the similarity between the video title of each short video in the each video set and the video title of the short video that is most recently watched in the watching record comprises:
obtaining, by the device, one or more words, which are in both the video title of each short video in the each video set and in the video title of the short video that is most recently watched in the watching record, and using a maximum weight in weights of the one or more words as the similarity.

7. A server, comprising a memory and a processor, the memory storing instructions, and the instructions, when executed by the processor, causing the processor to perform:
obtaining videos, the video comprising long videos and short videos;
obtaining a subset of the long videos, wherein values of video attributes of the subset of the long videos are greater than corresponding attribute thresholds, wherein the video attributes comprise watching times and a watching completion rate, the watching completion rate is obtained by dividing a sum of individual watching completion rates by a quantity of clicks numbers of the video being played, and each of the individual watching completion rates is obtained by dividing a duration of individual watching a video by a duration of the video;
obtaining a watching record of a user;
obtaining similarities between the short videos and videos in the watching record, to extract a preset quantity of the short videos having highest similarities; and
recommending the subset of the long videos or the preset quantity of the short videos to the user.

8. The server according to claim 7, wherein:
when the instructions cause the processor to perform the obtaining the subset of the long videos, the instructions cause the processor to perform:
obtaining, according to preset priority data, the subset of the long videos, wherein:
the long videos are updated within preset time, and the watching times of the subset of the long videos are greater than a times threshold, or the watching completion rate of the subset of the long videos is greater than a completion rate threshold.

9. The server according to claim 7, wherein:
when the instructions cause the processor to perform the obtaining the subset of the long videos, the instructions cause the processor to perform:
obtaining, according to preset priority data, the subset of the long videos, wherein:
the long videos are updated within preset time, and the watching times of the subset of the long videos are greater than a times threshold, and the watching completion rate of the subset of the long videos is greater than a completion rate threshold.

10. The server according to claim 7, wherein the instructions, when executed by the processor, further cause the processor to perform:
detecting whether exposure times of a video in long videos updated within preset time reach an exposure threshold, or whether a video in the long videos updated within the preset time appears in the watching record; and
when it is detected that the exposure times of the video in the long videos updated within the preset time reach the exposure threshold, or the video in the long videos updated within the preset time appears in the watching record, filtering out the video from recommending to the user.

11. The server according to claim 7, wherein, when the instructions cause the processor to perform the obtaining the similarities between the short videos and the videos in the watching record, to extract the preset quantity of the short videos having highest similarities, the instructions cause the processor to perform:
performing word segmentation on a video title of a short video that is most recently watched in the watching record, to obtain individual words;
querying in a pre-established video inverted index table by separately using the individual words as keywords, to obtain video sets formed by corresponding video identifiers;
calculating the similarity between a video title of each short video in each video set and the video title of the short video that is most recently watched in the watching record; and
extracting the preset quantity of the short videos having highest similarities.

12. The server according to claim 11, wherein, when the instructions cause the processor to perform the calculating the similarity between the video title of each short video in the each video set and the video title of the short video that is most recently watched in the watching record, the instructions cause the processor to perform:
obtaining one or more words, which are in both the video title of each short video in the each video set and in the video title of the short video that is most recently watched in the watching record, and using a maximum weight in weights of the one or more words as the similarity.

13. A non-transitory computer readable storage medium storing computer executable instructions, the computer executable instructions, when executed by one or more processors, causing the one or more processors to perform:
obtaining videos, the videos comprising long videos and short videos;
obtaining a subset of the long videos, wherein values of video attributes of the subset of the long videos are greater than corresponding attribute thresholds, wherein the video attributes comprise watching times and a watching completion rate, the watching completion rate is obtained by dividing a sum of individual watching completion rates by a quantity of numbers of the video being played, and each of the individual watching completion rates is obtained by dividing a duration of individual watching a video by a duration of the video;
obtaining a watching record of a user;
obtaining similarities between the short videos and videos in the watching record, to extract a preset quantity of the short videos having highest similarities; and
recommending the subset of the long videos or the preset quantity of the short videos to the user.

14. The non-transitory computer readable storage medium according to claim 13, wherein:
when the computer executable instructions cause the one or more processors to perform the subset of the long videos, the computer executable instructions cause the one or more processors to perform:
obtaining, according to preset priority data, the subset of the long videos, wherein:
the long videos are updated within preset time, and the watching times of the subset of the long videos are greater than a times threshold, or the watching completion rate of the subset of the long videos is greater than a completion rate threshold.

15. The non-transitory computer readable storage medium according to claim 13, wherein:
when the computer executable instructions cause the one or more processors to perform the subset of the long videos, the computer executable instructions cause the one or more processors to perform:
obtaining, according to preset priority data, the subset of the long videos, wherein:
the long videos are updated within preset time, and the watching times of the subset of the long videos are greater than a times threshold, and the watching completion rate of the subset of the long videos is greater than a completion rate threshold.

16. The non-transitory computer readable storage medium according to claim 13, wherein the computer executable instructions, when executed by the one or more processors, further cause the one or more processors to perform:
detecting whether exposure times of a video in long videos updated within preset time reach an exposure threshold, or whether a video in the long videos updated within the preset time appears in the watching record; and
when it is detected that the exposure times of the video in the long videos updated within the preset time reach the exposure threshold, or the video in the long videos updated within the preset time appears in the watching record, filtering out the video from recommending to the user.

17. The non-transitory computer readable storage medium according to claim 13, wherein, when the computer executable instructions cause the one or more processors to perform the obtaining the similarities between the short videos and the videos in the watching record, to extract the preset quantity of the short videos having highest similarities, the computer executable instructions cause the one or more processors to perform:
performing word segmentation on a video title of a short video that is most recently watched in the watching record, to obtain individual words;

querying in a pre-established video inverted index table by separately using the individual words as keywords, to obtain video sets formed by corresponding video identifiers;

calculating the similarity between a video title of each short video in each video set and the video title of the short video that is most recently watched in the watching record; and extracting the preset quantity of the short videos having highest similarities.

18. The non-transitory computer readable storage medium according to claim 17, wherein, when the computer executable instructions cause the one or more processors to perform the calculating the similarity between the video title of each short video in each video set and the video title of the short video that is most recently watched in the watching record, the computer executable instructions cause the one or more processors to perform:

obtaining one or more words, which are in both the video title of each short video in the each video set and in the video title of the short video that is most recently watched in the watching record, and using a maximum weight in weights of the one or more words as the similarity.

* * * * *